(12) United States Patent
Hata

(10) Patent No.: US 7,747,134 B2
(45) Date of Patent: Jun. 29, 2010

(54) INFORMATION RECORDING AND REPRODUCING DEVICE

(75) Inventor: Makoto Hata, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 1129 days.

(21) Appl. No.: 11/257,992

(22) Filed: Oct. 26, 2005

(65) Prior Publication Data

US 2006/0088289 A1    Apr. 27, 2006

(30) Foreign Application Priority Data

Oct. 26, 2004    (JP)    ............................. 2004-311098

(51) Int. Cl.
*H04N 7/00* (2006.01)
*H04N 5/00* (2006.01)
*H04N 5/91* (2006.01)
*H04N 5/93* (2006.01)

(52) U.S. Cl. .............................. 386/95; 386/46; 386/52; 386/83; 386/126

(58) Field of Classification Search .................. 386/83, 386/E5.064, E9.013, 95, 126, E9.04, 46, 386/52, E5.043; 369/275.1; 725/58; 348/E5.099, 348/E5.105; *G09B 27/012, 27/019, 27/033, G09B 27/05, 27/051, 27/01, 27/11, 27/029, G09B 27/011*
See application file for complete search history.

(56) References Cited

U.S. PATENT DOCUMENTS

| | | | |
|---|---|---|---|
| 5,963,704 A | * | 10/1999 | Mimura et al. ................. 386/95 |
| 6,795,097 B1 | | 9/2004 | Yamaguchi et al. |
| 6,859,608 B1 | * | 2/2005 | Nishikawa et al. ............. 386/46 |
| 2006/0114800 A1 | * | 6/2006 | Takakuwa et al. ........ 369/275.1 |

FOREIGN PATENT DOCUMENTS

| | | |
|---|---|---|
| JP | 05-067082 | 3/1993 |
| JP | 10-304304 A | 11/1998 |
| JP | 2001-75702 | 3/2001 |

OTHER PUBLICATIONS

Japanese Office Action dated May 9, 2007 with English translation (Two (2) Pages).

* cited by examiner

*Primary Examiner*—Thai Tran
*Assistant Examiner*—Syed Y Hasan
(74) *Attorney, Agent, or Firm*—Crowell & Moring LLP

(57) ABSTRACT

An information recording and reproducing device allows a content having data about title, among contents recorded on a recording medium, to be contained in a frame for distinguishing the title from a background image so as to generate a framed title image. For a content without data about title, the information recording and reproducing device generates a blank frame image to show the existence of content without a title. The information recording and reproducing device further superimposes the framed title image and the blank frame image on the background image so as to make a title menu screen, and records the title menu screen on the recording medium for display to a user. This title menu screen can enable the user to easily recognize a title of a content and the existence of content without a title which are recorded on the recording medium.

2 Claims, 5 Drawing Sheets

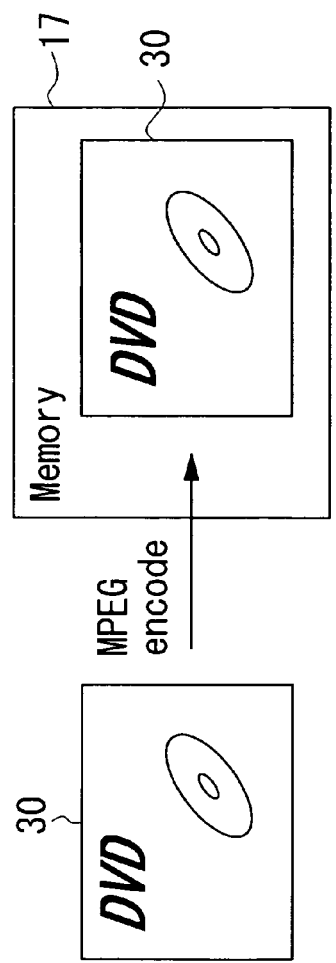
FIG. 2A  Background Image Generation
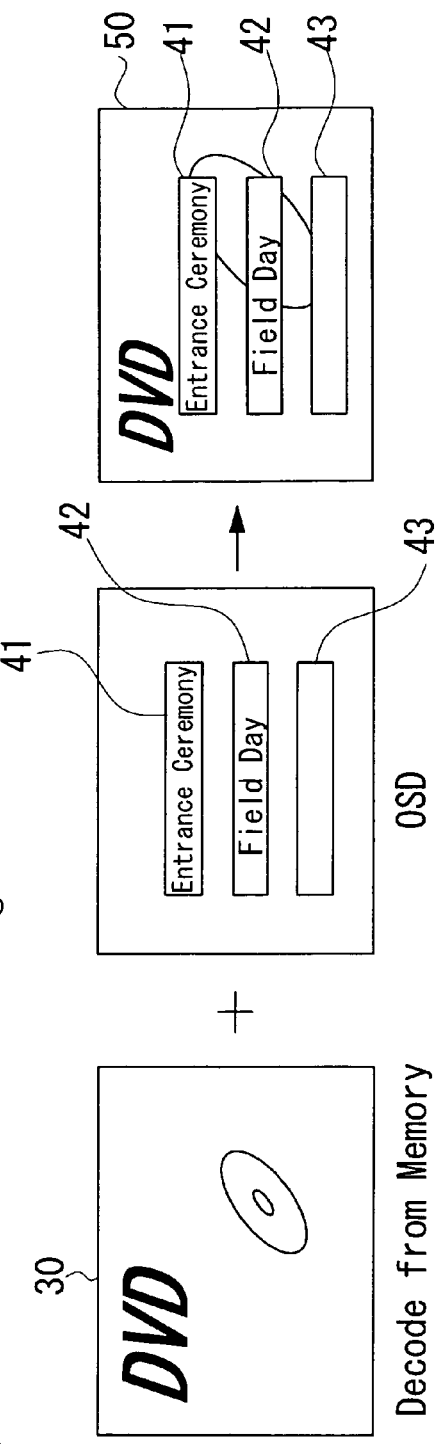
FIG. 2B  Title Menu Screen Making

| TITLE | VIDEO DATA | |
|---|---|---|
| ENTRANCE CEREMONY | VIDEO DATA A | ~61 |
| FIELD DAY | VIDEO DATA B | ~62 |
| — | VIDEO DATA C | ~63 |
| — | — | |

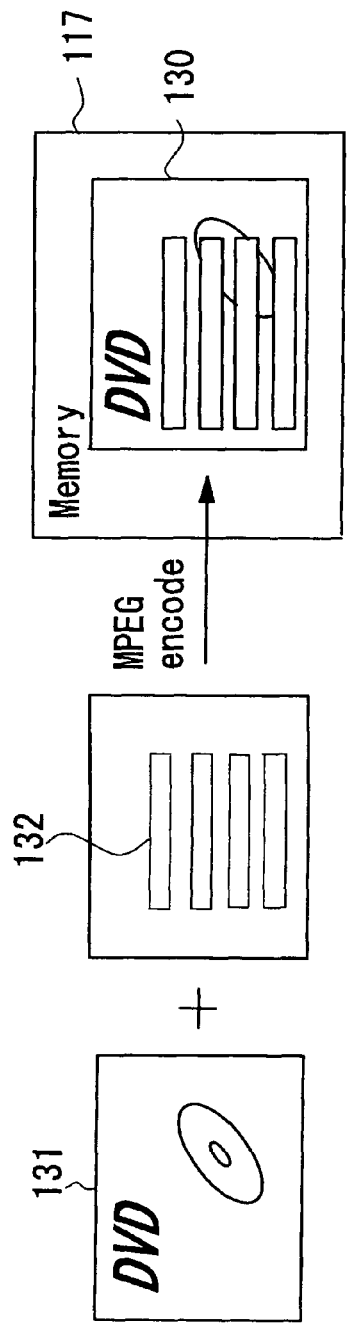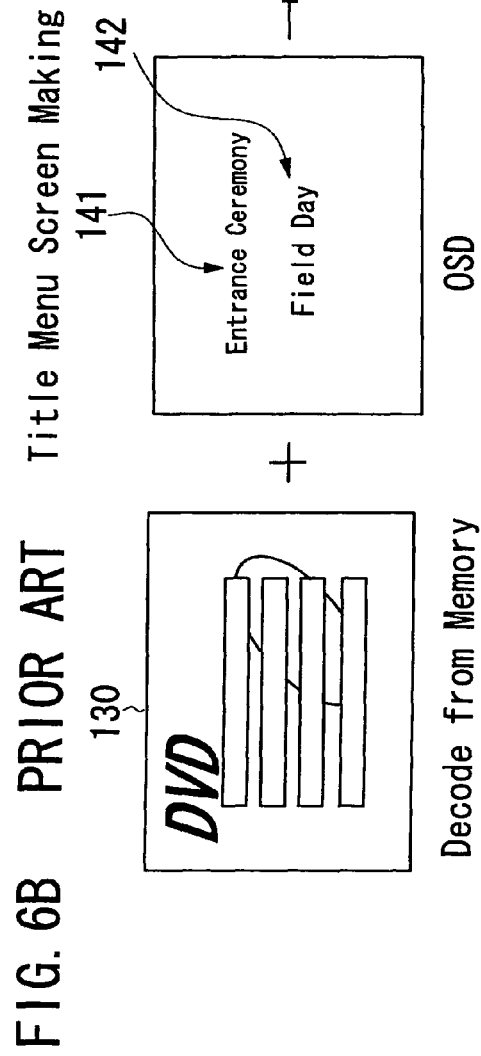
FIG. 6A PRIOR ART  Background Image Generation
FIG. 6B PRIOR ART  Title Menu Screen Making

INFORMATION RECORDING AND REPRODUCING DEVICE

BACKGROUND OF THE INVENTION

1. Field of the Invention

The present invention relates to an information recording and reproducing device for recording and reproducing information on a recording medium such as an optical disc or a hard disk.

2. Description of the Related Art

An information recording and reproducing device is known, in which, in order for a user to be able to easily identify contents recorded on a recording medium, a list of titles of the contents is superimposed on a background image so as to make a title menu screen, which is then recorded on the recording medium along with the contents.

In the known information recording and reproducing device, for example as shown in FIG. 6A, frames 132 for containing titles are formed in advance or already on an image 131 to make a background image 130, which is MPEG (Moving Picture Experts Group)-encoded and stored in a memory 117, and is used to make a title menu screen. As shown in FIG. 6B, the background image 130 is read out from the memory 117 to make a title menu screen 150. Titles 141 and 142 read out from a recording medium such as an optical disc are superimposed on the background image 130 so as to make a title menu screen 150, which is then recorded on the recording medium. In this way, the title menu screen 150 having the titles 141 and 142 contained in the frames is stored in the recording medium, thereby making it possible to plainly display a list of titles of contents to a user. In this connection, devices for enabling a user to easily recognize a character string in a menu item are known, such as information processing devices that display a character string in a given frame with scrolling display (refer to e.g. Japanese Laid-open Patent Publications 2001-75702 and Hei 5-67082).

However, since the information recording and reproducing device to display such title menu screen 150 as shown in FIG. 6B uses the background image 130 with the frames, formed in advance or already thereon, for containing the titles 141 and 142, there may be cases where the number of frames for containing the titles 141 and 142 does not match the number of titles, which causes display of unnecessary frames 151 and 152 on the title menu screen 150. In such case, it is difficult for a user to recognize at a glance whether or not the frames 151 and 152 contain titles. Further, some contents recorded on a recording medium may include a content without a title (i.e. content with no title given thereto) or a content with a title using only space (blank character). However, in the case of the title menu screen 150 as shown in FIG. 6B, a user cannot determine whether the frames 151 and 152 indicate that there exist no contents themselves or there exist contents without titles, so that the user cannot recognize the existence of contents without titles. This problem cannot be solved even by applying thereto the technology disclosed in the above Japanese Laid-open Patent Publication 2001-75702 or Hei 5-67082.

SUMMARY OF THE INVENTION

An object of the present invention is to provide an information recording and reproducing device capable of making, and recording on a recording medium, a title menu screen that can enable the user to easily recognize a title of a content and the existence of content without a title which are recorded on a recording medium.

According to a first aspect of the present invention, the above object is achieved by an information recording and reproducing device comprising: a title reading unit for reading data about titles of contents recorded on a recording medium; a title menu screen-making unit for making a title menu screen with a background image having the titles of the contents superimposed thereon, and for recording the title menu screen on the recording medium; and a framed title image-generating unit for allowing a content having data about title, among the contents recorded on the recording medium, to be contained in a frame for distinguishing the content from the background image so as to generate a framed title image for the title of the content.

Therein, the title menu screen-making unit makes, and records on the recording medium, a title menu screen with the background image having the framed title image superimposed thereon.

The information recording and reproducing device according to the first aspect of the present invention allows a content having data about title, among the contents recorded on the information recording and reproducing device, to be contained in a frame, and makes a title menu screen with the background image having a framed title image superimposed thereon, and further records the title menu screen on the recording medium. Accordingly, when the title menu screen is displayed, a user can at a glance recognize the title of the content recorded on the recording medium.

Preferably, the information recording and reproducing device further comprises a blank frame image-generating unit for generating, for a content without data about title among the contents recorded on the recording medium, a blank frame image to show the existence of content without a title. Therein, the title menu screen-making unit makes, and records on the recording medium, a title menu screen with the background image having the framed title image and/or the blank frame image superimposed thereon.

According to this preferred mode, the information recording and reproducing device generates a blank frame image for a content without data about title, and makes a title menu screen with the background image having the blank frame image superimposed thereon, and further records the title menu screen on the recording medium. Accordingly, in addition to the effect obtained by the first aspect of the present invention, the preferred mode has an effect that when the title menu screen is displayed, a user can easily recognize the existence of the content without title as well.

According to a second aspect of the present invention, the above object is achieved by an information recording and reproducing device comprising: a title reading unit for reading data about titles of contents recorded on an optical disc; a background image storage unit for storing a background image to be used for making a title menu screen; a title menu screen-making unit for making a title menu screen with the background image having the titles of the contents superimposed thereon, and for recording the title menu screen on the optical disc; a title menu screen display unit for reading, and displaying to a user, the title menu screen from the optical disc; a framed title image-generating unit for allowing a content having data about title, among the contents recorded on the optical disc, to be contained in a frame for distinguishing the content from the background image so as to generate a framed title image for the title of the content; and a blank frame image-generating unit for generating, for a content without data about title among the contents recorded on the optical disc, a blank frame image to show the existence of content without a title.

Therein, the title menu screen-making unit makes, and records on the optical disc, a title menu screen with the background image having the framed title image and/or the blank frame image superimposed thereon, wherein the title menu screen display unit displays, to the user, the title menu screen with the background image having the framed title image and/or the blank frame image superimposed thereon, so as to display the title of the content with the frame to the user without using, as the background image, an image having, formed in advance thereon, a frame for containing a title.

The optical disc device according to the second aspect of the present invention allows a content having data about title, among the contents recorded on the optical disc, to be contained in a frame for distinguishing the title from the background image so as to generate a framed title image. The optical disc device further superimposes the framed title image on the background image so as to make, and record on the optical disc, a title menu screen, and displays the title menu screen to a user. Accordingly, the user can easily distinguish the title from the background image and recognize the title of the content at a glance.

For the title menu screen, the optical disc device generates e.g. the framed title image separately from the background image, and superimposes the framed title image on the background image to make the title menu screen, rather than using a background image already having a frame for containing a title as the background image. This makes it possible to prevent a situation where the number of frame(s) for containing title(s) does not match the number of titles, which causes display of an unnecessary frame(s) on a title menu screen. This is in contrast to the case which uses the background image having, already formed thereon, a frame(s) for containing a title(s). Thus, the user can easily recognize the existence or non-existence of title(s) of content(s) by the existence or non-existence of the frame(s). Since the optical disc device does not use a background image having, already formed thereon, a frame(s) for containing a title(s) as the background image, it is possible to use an arbitrary image for the background image, and to easily change the background image.

Furthermore, for the content without data about title, the optical disc device generates the blank frame image to show the existence of content without a title, and superimposes the blank frame image on the background image to make the title menu screen, which is recorded on the optical disc and displayed to the user. Accordingly, the user can easily recognize the existence of content without a title as well on the title menu screen.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein:

FIG. 2A is a view for explaining a background image to be stored in a memory of the optical disc device, while FIG. 2B is a view for explaining a title menu screen to be made by the optical disc device and output to a monitor;

FIG. 6A is a view for explaining a background image to be used in a conventional information recording and reproducing device (optical device) for making a title menu screen, while FIG. 6B is a view for explaining the title menu screen.

DESCRIPTION OF THE PREFERRED EMBODIMENTS

Embodiments of the present invention, as best mode for carrying out the invention, will be described hereinafter with reference to the annexed drawings. It is to be understood that the embodiments described herein are not intended as limiting, or encompassing the entire scope of, the invention.

Figure 1:
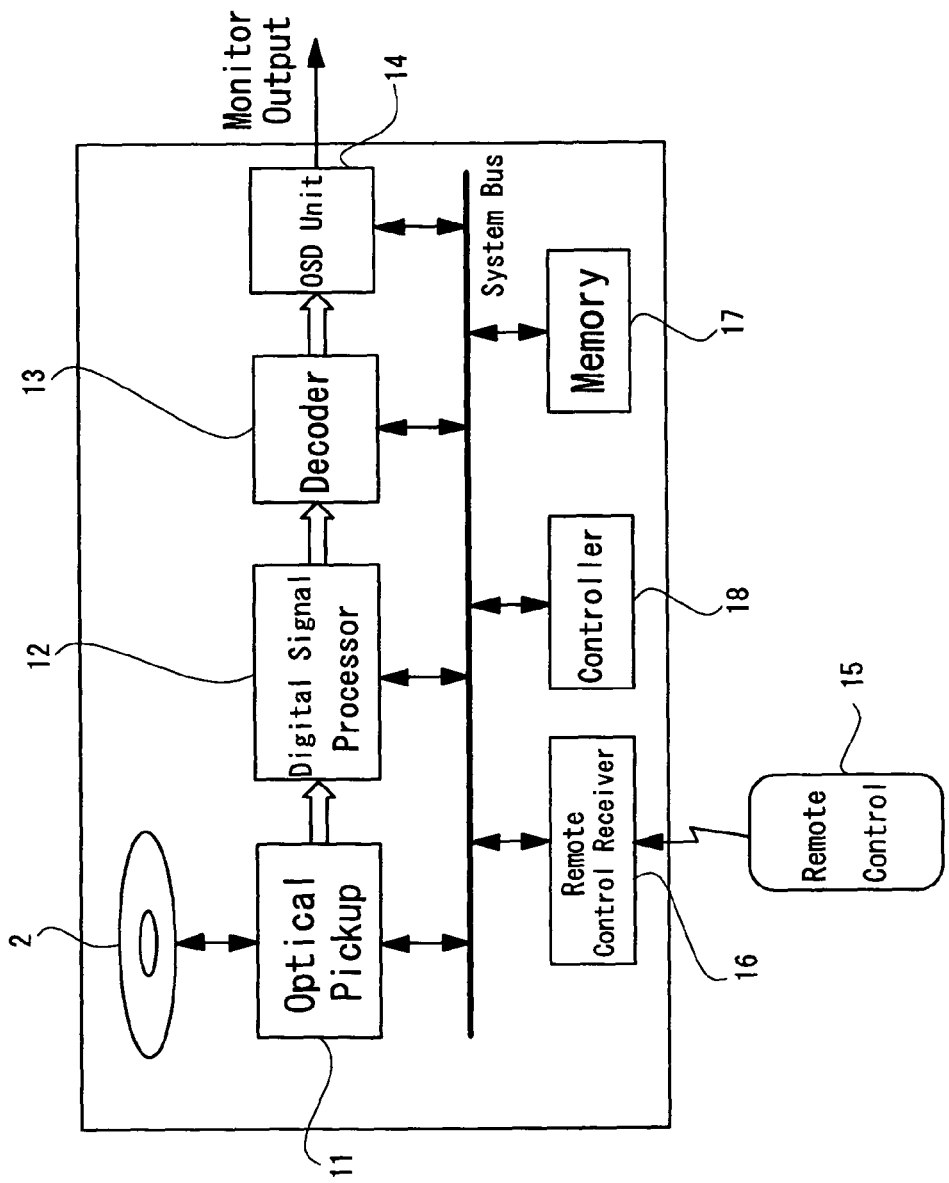
FIG. 1 is a block diagram schematically showing the configuration of an optical disc device as an information recording and reproducing device according to an embodiment of the present invention.

An information recording and reproducing device according to an embodiment of the present invention will be described hereinafter, using an optical disc device as an example of the embodiment. FIG. 1 is a block diagram schematically showing the configuration of an optical disc device 1 according to an embodiment of the present invention. As shown in FIG. 1, an optical disc device 1 is an information recording and reproducing device for recording and reproducing information on and from an optical disc (recording medium) 2 such as DVD (Digital Versatile Disc)-RAM (Random Access Memory), DVD±R (Recordable) and DVD±RW (Rewritable). The optical disc device 1 comprises: an optical pickup 11 for writing and reading data to and from the optical disc 2; a digital signal processor 12 for e.g. converting an RF (Radio Frequency) signal into a digital signal; a decoder 13 for e.g. MPEG (Moving Picture Experts Group)-decoding data input from the digital signal processor 12; an OSD (On Screen Display) unit 14 for subjecting image data, input from the decoder 13, to a given processing, and for outputting the thus subjected image data to e.g. a monitor connected thereto; a remote control 15; a remote control receiver 16 for receiving signals sent from the remote control 15; a memory 17 for storing e.g. a background image to be used for making a title menu screen; and a controller 18 for controlling the entire optical disc device 1.

The optical pickup 11 comprises a semiconductor laser, a collimating lens, a beam splitter, an objective lens, a collecting lens, a photodetector, and so on. The optical pickup 11 collects and irradiates laser light from the semiconductor laser onto the optical disc 2 through the collimating lens, the beam splitter and the objective lens so as to write and read data to and from the optical disc 2. The photodetector receives light reflected from the optical disc 2 through the objective lens, the beam splitter and the collecting lens. The intensity of the light detected by the photodetector is converted to an RF signal which is then output to the digital signal processor 12.

The digital signal processor 12 comprises: an RF signal processor for converting an RF signal into a digital signal; an 8/16 conversion circuit for subjecting the input digital signal to 8/16 modulation or 8/16 demodulation; an error correction circuit for subjecting the 8/16 demodulated data to error correction; and so on. The error-corrected data including image data is MPEG-decoded by the decoder 13, and output to the monitor via the OSD unit 14. The OSD unit 14 superimposes a given display image on the image data input from the decoder 13.

The remote control 15 includes e.g. a title menu display button to be operated (pressed) by a user for displaying a title menu screen, and sends an infrared signal to the remote control receiver 16 according to the operation of the button by the user. The signal sent from the remote control 15 is input to the controller 18 via the remote control receiver 16.

FIG. 2A is a view for explaining a background image to be stored in the memory 17, while FIG. 2B is a view for explaining a title menu screen to be made by the optical disc device 1 and output to the monitor. As shown in FIG. 2A, the memory (background image storage unit) 17 stores an image 30 in a state where it is MPEG-encoded, wherein the image 30 is prepared as a background image to be used for making a title menu screen, so that the image 30 will hereafter be referred to as background image 30. Description of FIG. 2B will be made later.

The controller 18 performs various processes according to programs stored in a ROM (Random Access Memory) (not shown), and performs a later described title menu screen-making process, thereby serving as a title reading unit, a title menu screen-making unit, a framed title image-generating unit and a blank frame image-generating unit. The controller 18 also performs a later described title menu screen display process, thereby serving as a title menu screen display unit. The optical disc device 1 further comprises a spindle motor for rotating the optical disc 2, a tracking motor for moving the optical pickup 11, and so on, wherein the spindle motor and the tracking motor are controlled by a given servo system.

Figure 3:
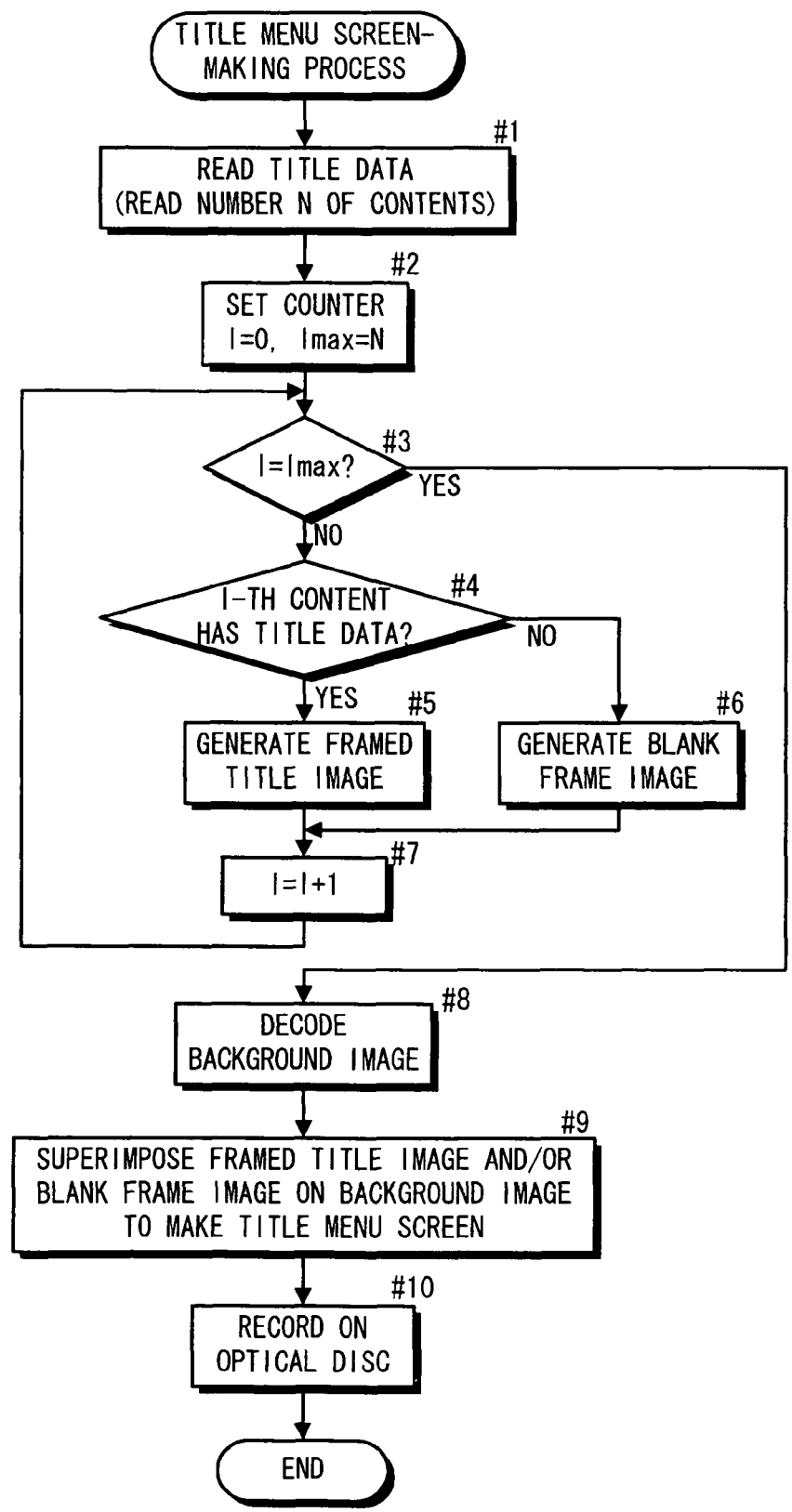
FIG. 3 is a flow chart showing a title menu screen-making process performed by the optical disc device.

Referring now to the flow chart of FIG. 3, a title menu screen-making process will be described. When starting the title menu screen-making process, the controller 18 first reads data about titles of contents (hereafter referred to as title data) from the optical disc 2 (#1), and sets a maximum value $I_{max}$ of a counter I according to the number N of contents recorded on the optical disc 2 (#2). Then, the controller 18 performs a loop process from the step #3 to the step #7 for the title of each content recorded on the optical disc 2 so as to generate a framed title image or a blank frame image for the title of the each content.

In the loop process from the step #3 to the step #7, the controller 18 determines whether or not the counter I has reached $I_{max}$ (#3). If the counter I has not reached $I_{max}$ (NO in #3), the controller 18 determines whether an I-th content has a title data (#4). If the I-th content has a title data (YES in #4), the controller 18 generates a framed title image having a title contained in a frame for distinguishing the title of the I-th content from a background image (#5), and increments the value of the counter I (#7). On the other hand, if the I-th content has no title data (NO in #4), the controller 18 generates a blank frame image to show the existence of content without a title for the I-th content (#6), and increments the value of the counter I (#7). The controller 18 repeats the loop process from the step #4 to the step #7 until the counter I reaches $I_{max}$ (YES in #3), so as to generate a framed title image(s) and/or a blank frame image(s) for all the contents recorded on the optical disc 2.

When the controller 18 generates a framed title image(s) and/or a blank frame image(s) for all the contents (YES in #3), the controller 18 reads out a background image 30 from the memory 17, and controls the decoder 13 to decode the background image 30 (#8). Then, the controller 18 controls the OSD unit 14 to superimpose the framed title image(s) and/or the blank frame image(s) on the decoded background image 30 so as to make a title menu screen (#9), and records the thus made title menu screen on the optical disc 2 (#10), thus ending the title menu screen-making process.

Figures 4, 5:
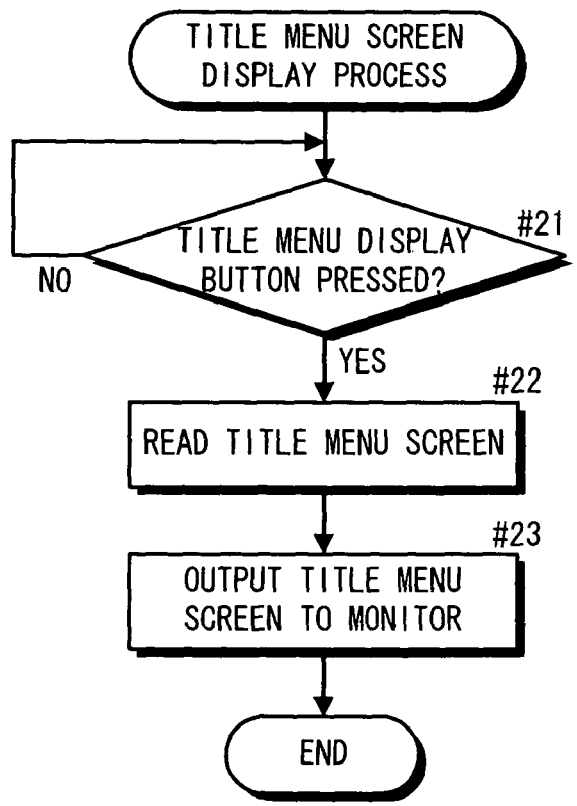
FIG. 4 is a table showing an example of contents (video data) each with a title data recorded on the optical disc.
FIG. 5 is a flow chart showing a title menu screen display process.

FIG. 4 is a table showing an example of contents (video data) each with a title data recorded on the optical disc 2. As shown in FIG. 4, if the optical disc 2 has recorded thereon a content 61 having a video data A with a title "Entrance Ceremony", a content 62 having a video data B with a title "Field Day", and a content 63 having a video data C without a title, then the controller 18 generates framed title images for the content 61 and the content 62, while the controller 18 generates a blank frame image for the content 63, by the above title menu screen-making process. Further, the controller 18 controls to superimpose these framed title images (41 and 42 in FIG. 2B) and the blank frame image (43 in FIG. 2B) on a background image (30 in FIG. 2B), thereby making a title menu screen (50 in FIG. 2B). Note that the title menu screen-making process is to be performed, for example, as a part of a finalization process that is performed to enable other information recording and reproducing devices to recognize the optical disc 2.

Referring now to the flow chart of FIG. 5, a title menu screen display process will be described. The controller 18 monitors whether or not the title menu display button of the remote control 15 is pressed by a user (#21). When the title menu display button is pressed (YES in #21), the controller 18 reads a title menu screen 50, as recorded above, from the optical disc 2 (#22), and outputs the title menu screen 50 to the monitor (#23).

As described above, the optical disc device 1 according to the embodiment of the present invention allows contents 61 and 62 having data about titles, among the contents 61, 62 and 63 recorded on the optical disc 2, to be contained in frames for distinguishing the titles from the background image 30 so as to generate framed title images 41 and 42. The optical disc device 1 further superimposes the framed title images 41 and 42 on the background image 30 so as to make, and record on the optical disc 2, the title menu screen 50, and displays the title menu screen 50 to a user. Accordingly, the user can easily distinguish the titles from the background image 30 and recognize the titles of the contents at a glance.

For the title menu screen 50, the optical disc device 1 generates e.g. the framed title images 41 and 42 separately from the background image 30, and superimposes the framed title images 41 and 42 on the background image 30 to make the title menu screen 50, rather than using a background image already having frames for containing titles as the background image 30. This makes it possible to prevent a situation where the number of frames for containing titles does not match the number of titles, which causes display of unnecessary frames on a title menu screen. This is in contrast to the prior art shown in FIGS. 6A and 6B which uses the background image 130 having, already formed thereon, frames for containing titles. Thus, the user can easily recognize the existence or non-existence of titles of contents by the existence or non-existence of the frames. Since the optical disc device 1 does not use a background image having, already formed thereon, frames for containing titles as the background image 30, it is possible to use an arbitrary image for the background image 30, and to easily change the background image 30.

Furthermore, for the content 63 without data about title, the optical disc device 1 generates the blank frame image 43 to show the existence of content without a title, and superimposes the blank frame image 43 on the background image 30 to make the title menu screen 50, which is recorded on the optical disc 2 and displayed to the user. Accordingly, the user can easily recognize the existence of content without a title as well on the title menu screen 50. This is in contrast to the prior art as shown in FIG. 6B, in which the frames 151 and 152 of the title menu screen 150 do not indicate whether there exist no contents themselves or there exist contents without titles.

It is to be noted that the present invention is not limited to the above-described specific embodiment, and various modifications are possible. For example, the recording medium can be e.g. a hard disk, not limited to an optical disc. In addition, it is not required to use, as a background image, the image 30 stored in the memory 17 in advance. An arbitrary image such as one recorded on the optical disc 2 can be used as the background image 30.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

What is claimed is:

1. An information recording and reproducing device comprising:
    a title reading unit for reading data about titles of contents recorded on a recording medium;
    a title menu screen-making unit for making a title menu screen with a background image having the titles of the contents superimposed thereon, and for recording the title menu screen on the recording medium;
    a framed title image-generating unit for determining, based on the data about titles of contents read by the title reading unit, whether a content among the contents recorded on the recording medium has data about title and, if the content has data about title, allowing the title to be contained in a frame for distinguishing the content from the background image so as to generate a framed title image for the title of the content; and
    a blank frame image-generating unit for determining whether a content among the contents recorded on the recording medium has data about title and, if the content has no data about title, generating, for the content without data about title, a blank frame image to show the existence of content without a title,
    wherein the title menu screen-making unit makes, and records on the recording medium, a title menu screen with the background image having superimposed thereon at least one of the framed title image generated by the framed title image-generating unit and the blank frame image generated by the blank frame image-generating unit.

2. An information recording and reproducing device comprising:
    a title reading unit for reading data about titles of contents recorded on an optical disc;
    a background image storage unit for storing a background image to be used for making a title menu screen;
    a title menu screen-making unit for making a title menu screen with the background image stored in the background image storage unit and having the titles of the contents superimposed thereon, and for recording the title menu screen on the optical disc;
    a title menu screen display unit for reading from the optical disc, and displaying to a user, the title menu screen recorded by the title menu screen-making unit;
    a framed title image-generating unit for determining, based on the data about titles of contents read by the title reading unit, whether a content among the contents recorded on the optical disc has data about title and, if the content has data about title, allowing the title to be contained in a frame for distinguishing the content from the background image so as to generate a framed title image for the title of the content; and
    a blank frame image-generating unit for determining, based on the data about titles of contents read by the title reading unit, whether a content among the contents recorded on the optical disc has data about title and, if the content has no data about title, generating, for the content without data about title, a blank frame image to show the existence of content without a title,
    wherein the title menu screen-making unit makes, and records on the optical disc, a title menu screen with the background image having superimposed thereon the framed title image generated by the framed title image-generating unit and/or the blank frame image generated by the blank frame image-generating unit, and
    wherein the title menu screen display unit displays, to the user, the title menu screen with the background image having the framed title image and/or the blank frame image superimposed thereon, so as to display the title of the content with the frame to the user without using, as the background image, an image having, formed in advance thereon, a frame for containing a title.

* * * * *